(12) United States Patent
Traster et al.

(10) Patent No.: US 7,853,373 B2
(45) Date of Patent: Dec. 14, 2010

(54) SYSTEM FOR STEERING A TRACTION DRUM DRIVEN MOBILE OBJECT

(75) Inventors: Elden Douglas Traster, Indianapolis, IN (US); Michael E. Harrison, Indianapolis, IN (US); Jason L. Zielke, Fishers, IN (US)

(73) Assignee: Precise Path Robotics, Inc., Indianapolis, IN (US)

( * ) Notice: Subject to any disclaimer, the term of this patent is extended or adjusted under 35 U.S.C. 154(b) by 0 days.

(21) Appl. No.: 12/368,591

(22) Filed: Feb. 10, 2009

(65) Prior Publication Data

US 2010/0199621 A1    Aug. 12, 2010

(51) Int. Cl.
*G01C 22/00* (2006.01)

(52) U.S. Cl. ............. 701/23; 56/10.7; 56/10.2 A; 701/25; 701/50; 404/123

(58) Field of Classification Search ......... 404/123, 404/128, 122, 117, 131, 133.1, 126; 180/305, 180/326; 56/7, 249, 294, 249.5, DIG. 20, 56/10.2 A, 10.7; 280/400, 419, 442; 701/23, 701/25, 50

See application file for complete search history.

(56) References Cited

U.S. PATENT DOCUMENTS

| | | | | |
|---|---|---|---|---|
| 2,057,417 A | * | 10/1936 | Clapper | 56/7 |
| 2,066,174 A | * | 12/1936 | Cregier | 56/11.6 |
| 4,046,485 A | * | 9/1977 | Dermond | 404/123 |
| 4,157,877 A | * | 6/1979 | Lee | 404/128 |
| 4,266,884 A | * | 5/1981 | Tuneblom | 404/122 |
| 4,769,976 A | | 9/1988 | Bassett et al. | |
| 5,204,814 A | * | 4/1993 | Noonan et al. | 701/25 |
| 5,533,326 A | | 7/1996 | Goman et al. | |
| 5,623,817 A | * | 4/1997 | Bricko et al. | 56/7 |
| 5,628,169 A | | 5/1997 | Stiller et al. | |
| 5,950,409 A | | 9/1999 | Davies | |
| 6,098,388 A | | 8/2000 | Davies | |
| 6,409,425 B1 | * | 6/2002 | Okabe et al. | 404/117 |
| 6,464,427 B1 | * | 10/2002 | Gottschling et al. | 404/117 |
| 6,487,837 B1 | | 12/2002 | Fillman et al. | |
| 6,622,464 B2 | | 9/2003 | Goman et al. | |
| 6,802,175 B2 | | 10/2004 | Fillman et al. | |
| 6,915,197 B2 | * | 7/2005 | Van der Lely | 701/50 |

(Continued)

FOREIGN PATENT DOCUMENTS

JP    07031245 A  *  2/1995

OTHER PUBLICATIONS

Salsco, Inc. Gas Greens Roller, Models 09060 and 09061, Information and Specification sheests (2 pages).

(Continued)

*Primary Examiner*—Árpád Fábián-Kovács
(74) *Attorney, Agent, or Firm*—Woodard, Emhardt, Moriarty McNett & Henry, LLP

(57) ABSTRACT

A turf device driven by a traction drum. The traction unit is connected to the tool by an articulable joint which allows the traction unit to rotate horizontally (yaw) and vertically (pitch), as well as roll side-to-side in relation to the tool. The articulation allows the tool and the traction unit to follow undulations in the terrain separately and allows the mobile object to turn by yawing the traction member in relation to the tool.

15 Claims, 5 Drawing Sheets

U.S. PATENT DOCUMENTS

| | | | |
|---|---|---|---|
| 7,168,227 | B2 | 1/2007 | Derby et al. |
| 7,185,478 | B1 * | 3/2007 | Willis, II ................. 56/10.2 A |
| 7,191,584 | B2 | 3/2007 | Goman et al. |
| 7,668,631 | B2 * | 2/2010 | Bernini ........................ 701/23 |
| 2002/0104300 | A1 * | 8/2002 | Hunt ........................... 56/10.6 |
| 2003/0023356 | A1 * | 1/2003 | Keable ........................ 701/23 |
| 2005/0034437 | A1 * | 2/2005 | McMurtry et al. ............... 56/1 |
| 2005/0046373 | A1 * | 3/2005 | Aldred ....................... 318/580 |
| 2006/0054376 | A1 * | 3/2006 | Shrive et al. ................ 180/305 |
| 2006/0059880 | A1 * | 3/2006 | Angott .................... 56/10.2 A |
| 2006/0113141 | A1 * | 6/2006 | Ackermann ................ 180/326 |
| 2006/0161318 | A1 * | 7/2006 | Aldred et al. ................. 701/23 |
| 2007/0142964 | A1 * | 6/2007 | Abramson ................. 700/245 |
| 2008/0007193 | A1 * | 1/2008 | Jones et al. ............ 318/568.12 |
| 2008/0039974 | A1 * | 2/2008 | Sandin et al. ............... 700/258 |

OTHER PUBLICATIONS

Salsco, Inc. Speed Roller, Information and Specification sheets (2 pages).

Salsco, Inc. Electric Greens Roller, Model 0009054, Information and Specification sheets (2 pages).

\* cited by examiner

SYSTEM FOR STEERING A TRACTION DRUM DRIVEN MOBILE OBJECT

FIELD OF THE INVENTION

The present invention relates to a device driven by a traction drum for performing work upon underlying turf. In particular, the present invention concerns the mounting of a traction drum to the device so that it can be steered over turf without requiring the operator to physically manipulate the device and without damaging the turf.

BACKGROUND OF THE INVENTION

The prior art includes many riderless mowers which include a traction drum. These prior art mowers are unable to turn on terrain without the operator lifting the cutting head off of the terrain to prevent damage by tilting the mower back onto the traction drum. The prior art also includes steerable turfgrass mowers that use three pneumatic tires rather than a traction drum. These steerable turfgrass mowers lack many of the advantages of traction drum driven mowers, including a more even distribution of weight which prevents the device from damaging the turf during operation. In addition, autonomous devices, such as robotic devices, exist for performing predefined tasks, such as mowing areas of turf. However, these devices are not able to rotate back upon a traction drum similar to how a user manipulates traditional turfgrass mowers. Therefore, in order for the advantages of turfgrass mowers having a traction drum to be realized within an autonomously controlled mower, a system capable of turning the mower without operator assisted tilting is needed.

SUMMARY OF THE INVENTION

In one form a system is provided for propelling and steering a mobile object having a traction drum. According to the illustrative embodiment, the mobile object includes a traction drum as part of a drive section. The drive section can be rotated by a steering motor independently of the steering section, thus altering the path of the mobile object. Preferably, the mobile object includes attached tools. In this form, since the tool is no longer lifted by the operator's tilting of the mobile object, a lifting motor lifts the tool off of the terrain when necessary. In one further form, the tool is a reel-type turfgrass cutting head and a grass basket to collect grass clippings is also included and can be lifted by the lifting motor. In a further form, the mobile object includes a traction drum as well as a steering member for controlling the direction of the mobile object. The traction drum remains fixed and the steering member rotates to direct the movement of the mobile object.

In a further preferred form, the mobile object steers by utilizing differential traction drums. Two independently powered, side by side traction drums are included. As such, by controlling the rates of rotation of the drums, the mobile object may be turned accurately.

This summary is provided to introduce a selection of concepts in a simplified form that are described in further detail in the detailed description and drawings contained herein. This summary is not intended to identify key features or essential features of the claimed subject matter, nor is it intended to be used as an aid in determining the scope of the claimed subject matter. Yet other forms, embodiments, objects, advantages, benefits, features, and aspects of the present invention will become apparent from the detailed description and drawings contained herein.

DESCRIPTION OF THE SPECIFIC EMBODIMENTS

Figure 1A:
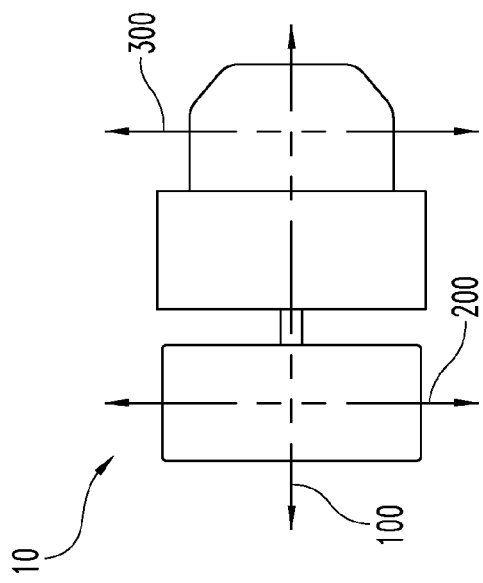
FIG. 1A illustrates a top view of a mobile object with the axes marked.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1C:
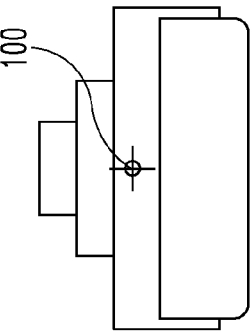
FIG. 1C illustrates a top view of a mobile object with the axes marked.
Figure 1B:
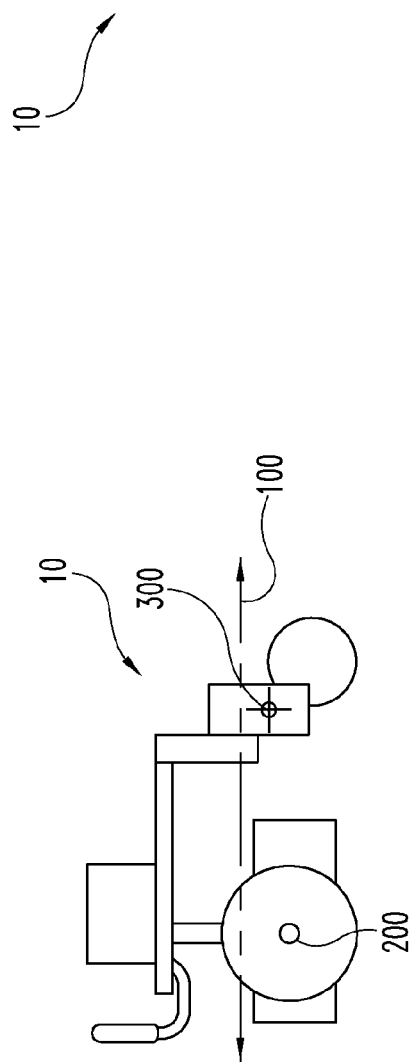
FIG. 1B illustrates a side view of a mobile object with the axes marked.

The various axes of a representative turf device 10 will be described with reference to the several views of FIGS. 1A-1C. The turf device 10 has a central axis 100 that runs from the rear (aft section) of the mobile object to the front (forward section) of the turf device 10 and is generally parallel to the direction of movement during straight line travel. The turf device 10 is propelled by a traction drum that has an axis of rotation 200 which is generally perpendicular to the central axis 100 during straight line travel. Also, during straight line travel the longitudinal axis of the tool 300 is generally parallel to the traction drum axis of rotation 200, and thus generally perpendicular to the central axis 100.

Figure 2:
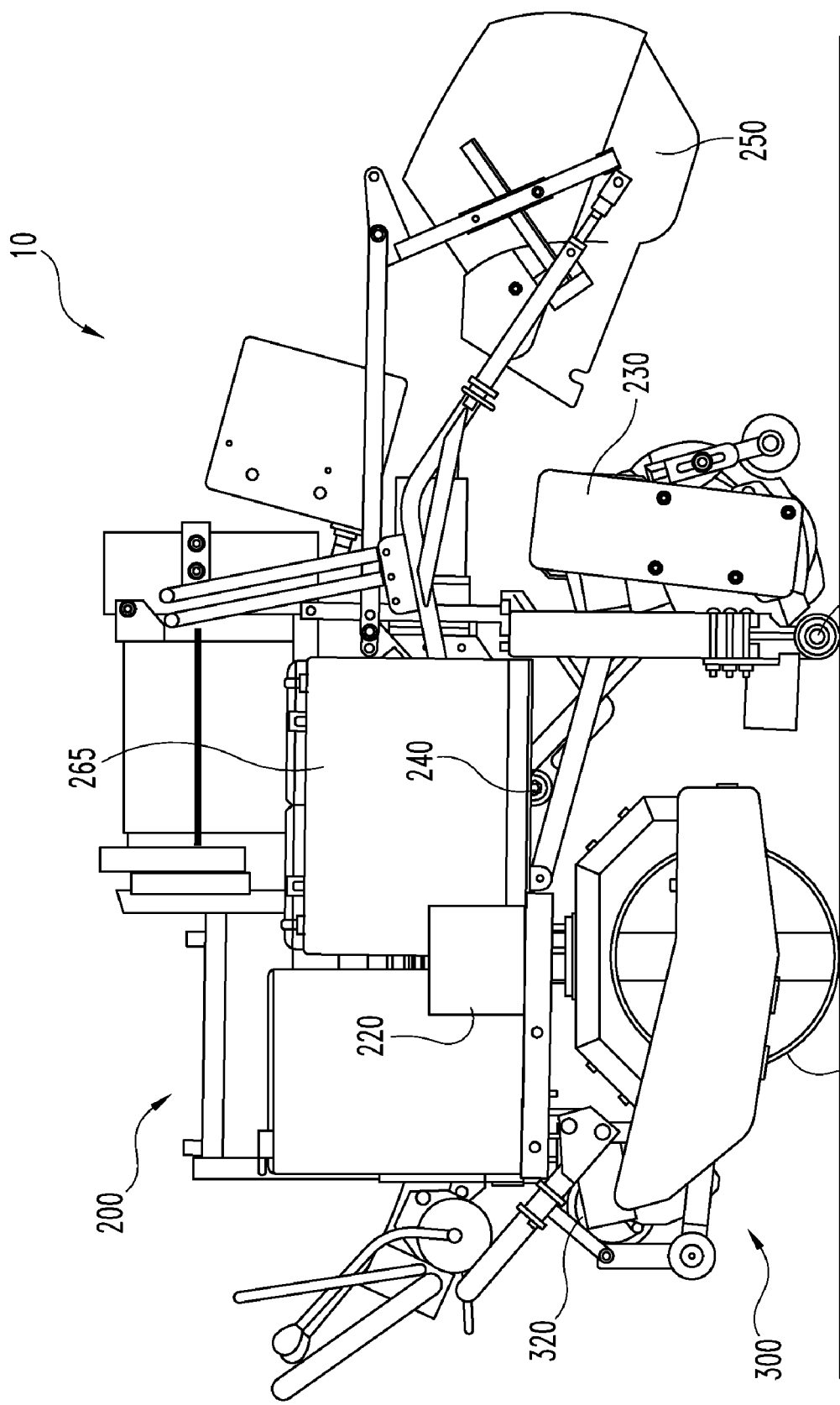
FIG. 2 illustrates a side view of a mobile object according to one embodiment of the present invention.

The illustrative embodiment of the present invention will be described with reference to FIG. 2. The chassis of turf device 10 is comprised of a steering section 200 and a drive section 300. The steering section 200 has a central axis (not shown), which runs from the rear of the steering section 200 to the front of the steering section 200, and is parallel to the central access 100 of turf device 10 (shown in FIG. 1).

The drive section 300 is connected to the steering section 200 to allow the steering section 200 to pivot the drive section 300 during operation, thus allowing the turf device 10 to alter its path during propulsion.

A traction drum 310 and drive motor 320 are mounted to the drive section 300 such that the traction drum 310 is in contact with the ground to propel the turf device 10. The axis of rotation of the traction drum 310 is preferably substantially perpendicular to the central axis of the steering section 200 during straight line travel. The traction drum 310 can be made out of a variety of materials, such as, but in no way limited to, aluminum, steel, plastic, or rubber. In one form, the traction drum 310 has a diameter of less than 24". In the preferred form, the traction drum 310 has a diameter of less than 10". Additionally, the traction drum 310 is preferably hollow to minimize weight. Still further, the traction drum is preferably at least the width of the chassis of turf device 10 so as to provide a larger area for distribution of weight. For further information on traction drums, as well as other concepts herein, see U.S. Pat. No. 7,191,584 to Goman et al., the content of which are hereby incorporated by reference.

The drive motor 320 is mechanically connected to the traction drum 310 so as to rotate the traction drum 310 to provide controlled propulsion for the turf device 10. Because the steering section 200 can pivot with respect to the drive section 300, the drive motor 320 is preferably located on the drive section 300 and adjacent the traction drum 310 to avoid the need for a complex mechanical connection between the drive motor 320 and the traction drum 310.

In the illustrated embodiment, turf device 10 includes at least one ground engaging portion 210 coupled to the steering section 200 to aid the traction drum 310 in supporting the chassis of turf device 10. The ground engaging portion 210 may be a longitudinal roller, one or more pneumatic tires, or the like.

Additionally, in the illustrated embodiment, a steering motor 220 is included on the steering section 200 to pivot the drive section 300 in relation to steering section 200 to provide controlled steering of turf device 10 during propulsion. By pivoting drive section 300, the axis of rotation of traction drum 310 is no longer substantially perpendicular to the central axis of steering section 200, which thus directs turf device 10 along an arced path having a controllable radius.

In certain preferred embodiments, a tool 230 is preferably attached to the chassis of turf device 10. Preferable, the tool 230 is attached to steering section 200 to perform work on the terrain over which the turf device 10 travels. The tool 230 may be various mechanical and/or powered implements, such as, but in no way limited to, a grass mower, an aerator, or a verticutting head. Preferably, the longitudinal axis of the tool 230 is substantially perpendicular to the central axis of the steering section 200 in order to achieve a maximized work area during normal straight line propulsion. In some forms, a portion of tool 230 serves as the ground engaging portion 210 to support the chassis of turf device 10. For some types of tools, it may be undesirable to leave the tool 230 on the turf at all times. An optional lifting motor 240 may be included, as shown in the illustrated embodiment, to raise and lower the tool 230 from engaging the turf or travel surface when desired.

In the illustrative embodiment, the tool 230 is a reel-type turfgrass cutting head. This type of cutting head 230 is often employed by golf courses and other turf management professionals where a high quality cut is desired. Some applications call for the grass clippings produced by the cutting head 230 to be captured, and for this reason, a grass basket 250 may optionally be included for capturing the clippings. In this form, the cutting head 230 includes two rollers, and the rear roller is used to replace the ground engaging portion 210.

As mentioned above, it may be undesirable for the cutting head 230 to be in contact with the ground at all times. For example, leaving the cutting head 230 fully lowered during 180 degree turns could cause unnecessary damage to the turf or the tool, such as leaving the cutting head 230 down in areas that are not to be cut. As such, in the preferred form, the lifting motor 240 operates to tilt the cutting head 230 up and off of the ground while the rear roller remains in contact with the ground as a substitute for the ground engaging portion 210. Since the grass basket 250 is positioned along the ground to collect the clippings from the cutting head 230 it preferably is lifted as well. The lifting motor 240, through a series of gears, lifts both the cutting head 230 and grass basket 250 simultaneously. Preferably, the grass basket 250 is lifted at an angle that causes the grass clippings to fall deeper into the grass basket 250 rather than spilling onto the turf. This may allow for more clippings to be placed in the grass basket 250 before it is required to be emptied.

In a further form (not shown), the tool 230 is not attached directly to the steering section 200, but rather is attached to turf device 10 in a floating configuration, such as is commonly known in reel type cutting heads of the golf course industry. The floating configuration may allow the tool 230 to pitch fore and aft as well as roll side to side in order to follow undulations in the terrain independently of the movement of the turf device 100. When desired, the lifting motor 240 lifts the entire tool 230 off of the terrain. Once again the tool can be a variety of implements, but some types of tools will benefit more from following undulations in the terrain than other types. For example, when using a reel-type turfgrass cutting head, following undulations in the terrain can limit the amount of missed tall areas and scalped areas.

In some embodiments, the joint between the steering section 200 and drive section 300, or a joint internal to one of the two sections, allows the sections to roll side to side independently of one another. This allows the tool 230 to better follow undulations in the terrain.

The turf device 10 in the illustrative embodiment is preferably powered entirely by an electric battery 265. Electric power removes issues of fuel or hydraulic fluid leaks that can damage turf, as well as reduces noise which may pollute the intended area of operation. Electrical power also allows the use of flexible electrical power cables, which in turn allow the power source to be separated from the drive section 300. It shall be appreciated that although a single electric battery is described, it could be replaced or augmented with other power sources such as, but in no way limited to, multiple batteries, batteries of advanced chemistries, solar power, super capacitors, or fuel cells. In the event that the turf device 10 requires additional power, an internal combustion engine and/or generator may be added to the system to create a hybrid system or used completely in place of the battery. To further reduce power consumption of the turf device 100, power can be regeneratively captured from various mechanical systems on the mower. Examples include but are not limited to capturing energy from stopping of the turf device 100 and the lowering of the tool 230.

Figure 3:
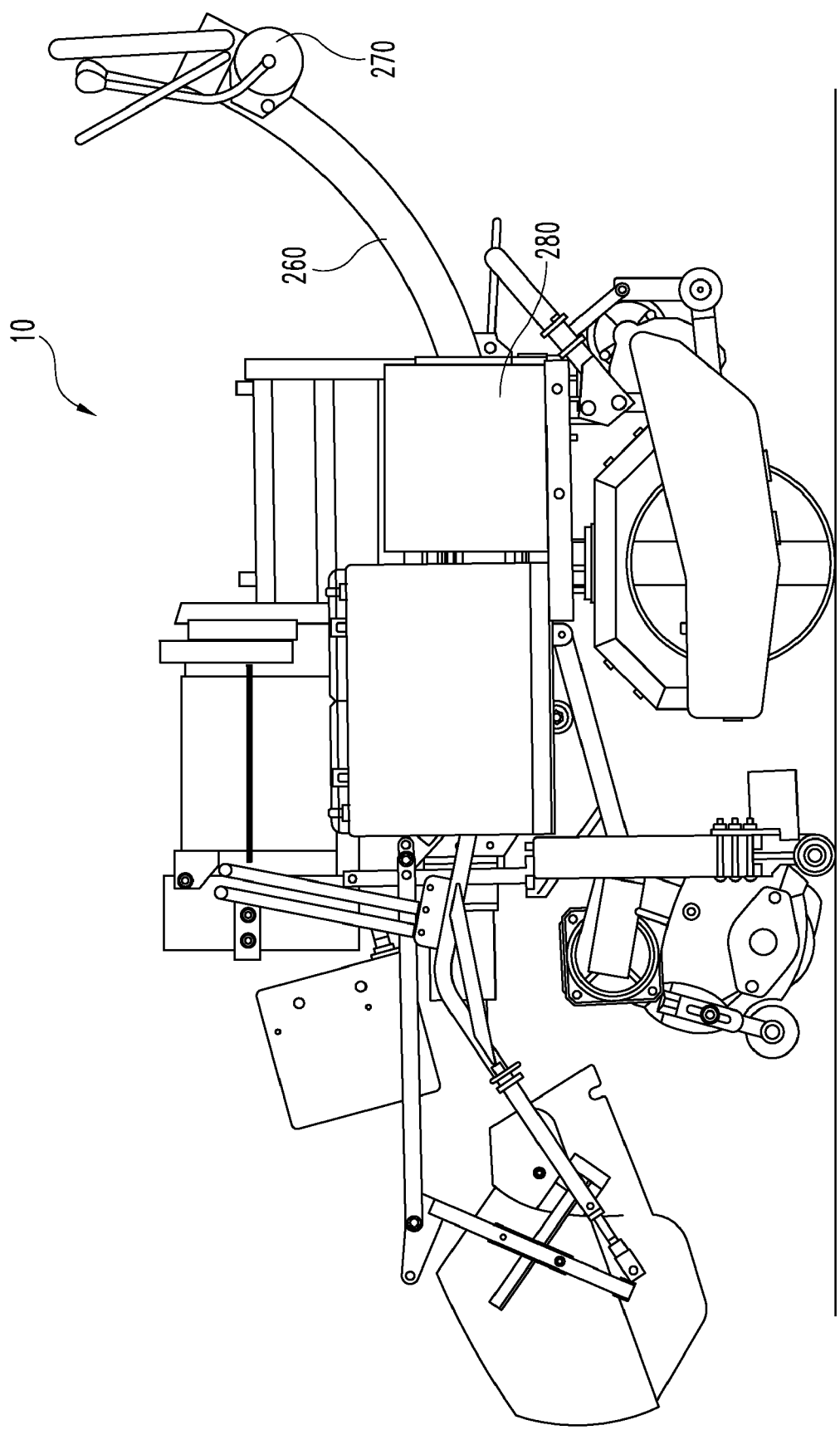
FIG. 3 illustrates a side view of a mobile object according to a further embodiment of the present invention.

The illustrative embodiment will now be further described with reference to FIG. 3, which shows a side view of the turf device 100 including an operator handle 260 at the rear. The operator handle 260 is retractable and can be placed in an operational or stowed position. In the stowed position (not show) the operator handle 260 retracts within the turf device 100 and simplifies storage, transportation, remote operation, and computer controlled operation using computer 280, of the turf device 10. For more on this autonomous control, see U.S. patent application Ser. No. 12/180,844 (filed Jul. 28, 2008) entitled System and Method for Autonomous Vehicle Localizations, the contents of which are hereby incorporated by reference. The operator handle 260 is preferably curved to allow the top to be at approximately waist height of the operator when in the operator position. An operator can use the operator handle 260 to physically control the turf device 10. Electrical controls 270 at the top of the operator handle 260 preferably allow an operator to control the various motors and functions of the turf device 100.

Figure 4:
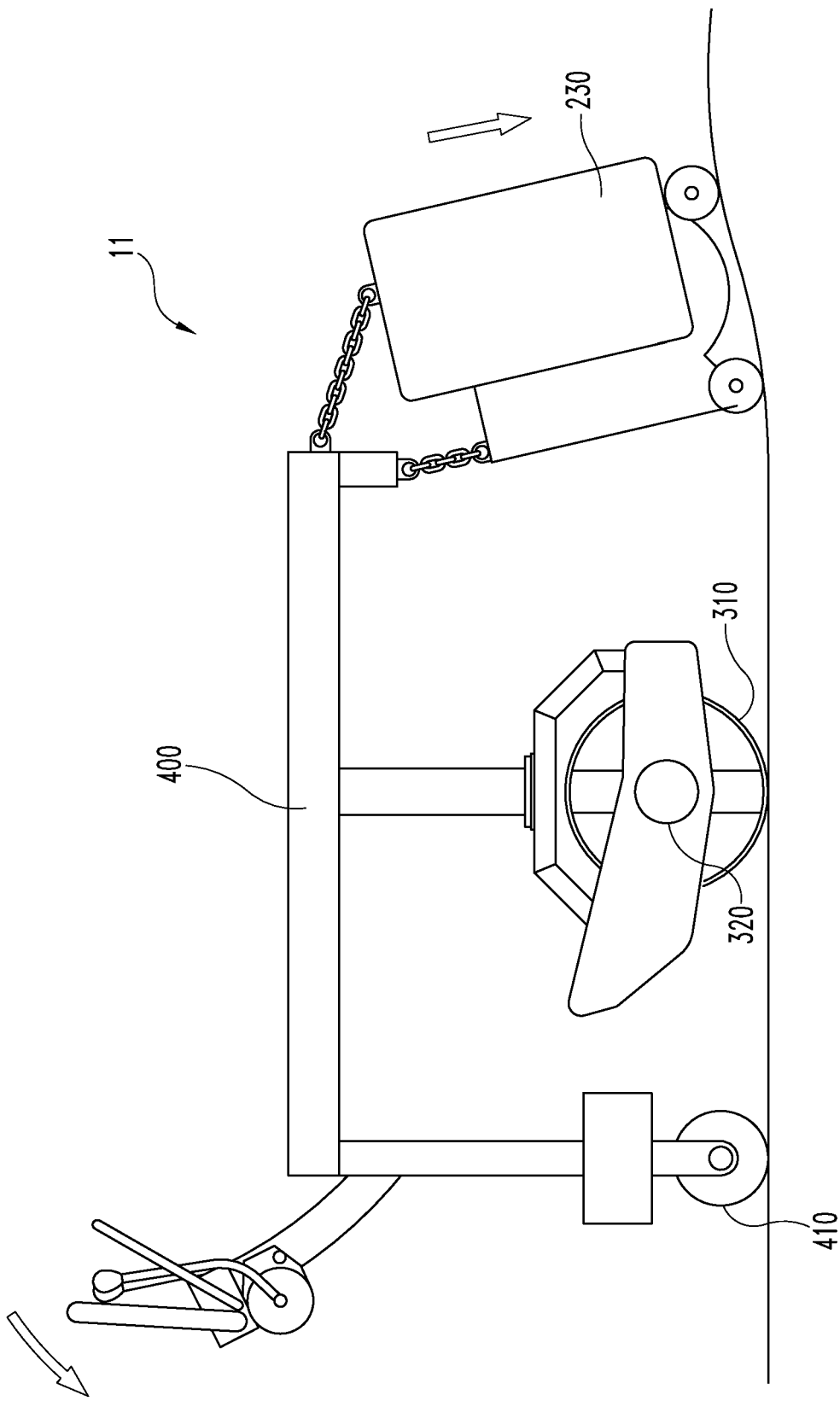
FIG. 4 illustrates a side of a mobile object with a steering member according to a further embodiment of the present invention.

An alternative embodiment of a turf device 11 according to the present invention will now be described with reference to FIG. 4, which shows a side view of the turf device 11. The turf device 11 differs from the other embodiments by utilizing an alternative steering system. The turf device 11 includes a ground engaging traction drum 310 that is attached to the chassis 400. The drive motor 320 is configured to rotate the traction drum 310 to provide the turf device 11 propulsion.

Also attached to the chassis 400 is a ground engaging steering member 410, which is substantially centered within the width of the turf device 10. Pivoting the steering member 410 during propulsion alters the path of the turf device 10. A steering motor (not shown) is preferably included to pivot the steering member 410. As with other embodiments, the turf device 11 includes a tool 230 for performing work on the terrain. Because the tool 230 is a third point of ground contact, it must be configured in a floating configuration to properly follow the undulations of the terrain. To better follow undulations in the terrain, the traction drum 310 can be attached to the rest of the chassis 400 with a pivoting joint to allow the chassis 400 to roll side to side independently of the traction drum 310.

Figure 5:
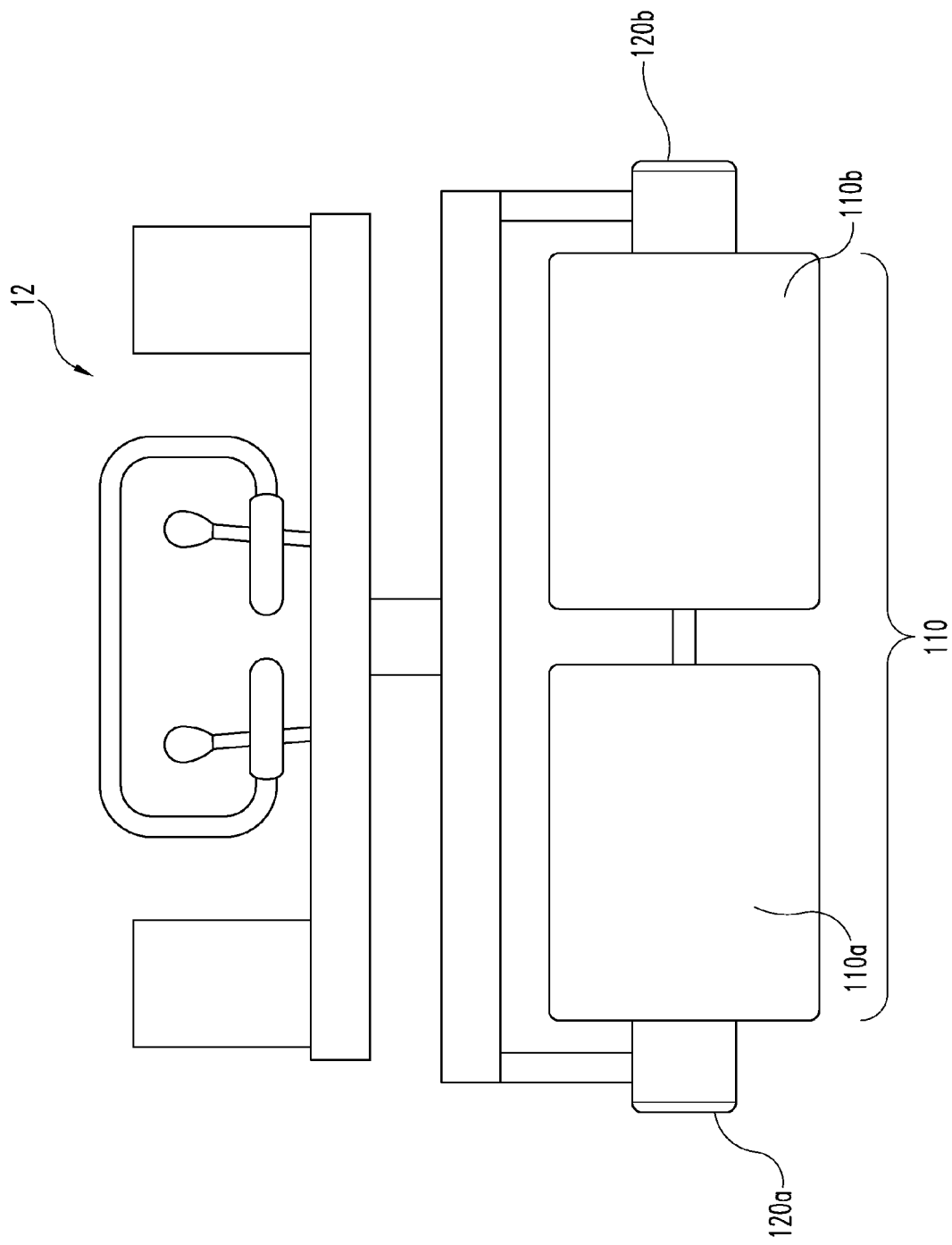
FIG. 5 illustrates a rear view of a mobile object with differential steering according to a further embodiment of the present invention.

Another alternative embodiment of the present invention will now be described with reference to FIG. 5, which shows a rear view of a turf device 12. According to this embodiment, the turf device 12 utilizes yet another unique steering system in the form of a differential steering assembly. The traction drum assembly 110 consists of a first traction drum 110a and a second traction drum 110b. The rotational axes of the two traction drums 110 are substantially aligned. However, the two traction drums 110 are free to rotate independently of each other. The first traction drum 110a is driven by the first drive motor 120a, and the second traction drum 110b is driven by the second drive motor 120b. The two drive motors 120 can be powered at substantially equal levels to propel the turf device 10 forward, or at various different levels to cause the turf device 10 to travel in a curved path or to turn in place. To better follow undulations in the terrain, the traction drum assembly 110 can be attached to the rest of the chassis of the turf device 12 with a pivoting joint to allow the chassis to roll side to side independently of the traction drum assembly 110.

While the invention has been illustrated and described in detail in the drawings and foregoing description, the same is to be considered as illustrative and not restrictive in character. Only the preferred embodiment, and certain alternative embodiments deemed useful for further illuminating the preferred embodiment, have been shown and described. All changes and modifications that come within the spirit of the invention are desired to be protected.

What is claimed is:

1. A mobile object for manipulating turf comprising:
   a chassis comprising a drive section coupled to a steering section, said steering section having a central axis parallel to its intended direction of movement;
   a ground engaging traction drum having a rotational axis and a length greater than its radius coupled to said drive section;
   a first motor operatively coupled to said ground engaging traction drum such that said first motor is operable to drive said ground engaging traction drum by rotating it about said rotational axis;
   a ground engaging roller having a second rotational axis and a length greater than its radius coupled to said steering section, wherein said second rotational axis is perpendicular to said central axis and said roller is mounted in front of said traction drum with relative to the intended direction of movement;
   a second motor operably connected to said steering section such that said second motor is operable to rotate said drive section with respect to said steering section such that the rotational axis of said traction drum is rotated to an offset position within an angular range relative to the central axis of said steering section, wherein said drive section is pivotally coupled to said steering section such that said steering section may roll side to side about a horizontal axis perpendicular to said rotational axis of said traction drum at any offset position within said angular range; and
   an onboard electronic controller having a localization system, said onboard electronic controller being operable to autonomously control said first motor and said second motor so as to navigate said mobile object across a defined area of terrain absent human interaction.

2. The mobile object of claim 1, wherein said chassis comprises a tool operable to perform work on the terrain over which the chassis travels.

3. The mobile object of claim 2, wherein said ground engaging portion is a portion of said tool.

4. The mobile object of claim 1, wherein said angular range is at least 45 degrees.

5. The mobile object of claim 2, further comprising a lifting motor mounted to said chassis, wherein said lifting motor is operably connected to said tool such that said lifting motor is operable to selectively raise said tool vertically in relation to said ground engaging traction drum so as to raise said tool off of the terrain.

6. The mobile object of claim 2, wherein said tool is a grass mower comprising at least one grass cutting blade.

7. The mobile object of claim 6, wherein said grass mower is a reel-type turfgrass cutting head.

8. The mobile object of claim 7, further comprising:
   a grass collection basket configured to collect grass clippings from said reel-type turfgrass cutting head; and
   a lifting motor configured to simultaneously raise said reel-type turfgrass cutting head and said grass collection basket.

9. The mobile object of claim 8, wherein said grass collection basket is raised at an angle such that said grass collection basket's opening faces upward and away from said terrain.

10. The mobile object of claim 2, wherein said tool is coupled to said chassis in a floating configuration.

11. The mobile object of claim 10, further comprising a lifting motor mounted to said chassis, wherein said lifting motor is operably connected to said tool such that said lifting motor is operable to selectively raise said tool off of the terrain.

12. The mobile object of claim 1, wherein said ground engaging portion is selected from the group consisting of a wheel, a track, or a roller.

13. The mobile object of claim 1, wherein said steering and drive sections are operably connected so as to allow said sections to rotate about a vertical axis independently of one another through at least a 45 degree angle.

14. The mobile object of claim 1, further comprising an electric energy storage device, wherein said motors are electrically connected to and exclusively powered by said electrical energy storage device.

15. The mobile object of claim 1, wherein said ground engaging traction drum extends at least substantially the width of said chassis.

* * * * *